United States Patent [19]

Tschan

[11] 4,411,548

[45] Oct. 25, 1983

[54] JOIST HANGER

[75] Inventor: J. Donald Tschan, Bellevue, Wash.

[73] Assignee: P. H. Bowman Co., Inc., Seattle, Wash.

[21] Appl. No.: 271,361

[22] Filed: Jun. 8, 1981

[51] Int. Cl.³ .......................... B25G 3/00; F16B 7/08; F16B 9/00; F16L 41/00
[52] U.S. Cl. .................................... 403/232.1; 52/289
[58] Field of Search ....................... 403/232.1; 52/289

[56] References Cited

U.S. PATENT DOCUMENTS

| | | |
|---|---|---|
| 546,147 | 9/1895 | Gregg . |
| 783,807 | 2/1905 | Tuteur ............................ 403/232.1 |
| 832,133 | 10/1906 | Lanz . |
| 2,500,636 | 3/1950 | Isakson . |
| 3,222,831 | 12/1965 | Pritchard . |
| 3,601,428 | 8/1971 | Gilb ................................ 403/232.1 |

FOREIGN PATENT DOCUMENTS 1431122  4/1976  United Kingdom ............. 403/232.1

OTHER PUBLICATIONS

Bowman Catalog, p. 17, Joist Hangers BJI.

Primary Examiner—Wayne L. Shedd
Attorney, Agent, or Firm—John O. Graybeal

[57] ABSTRACT

A joist hanger (10) includes a U-shaped seat portion (16) composed of a flat seat base (18) and a pair of seat sidewalls (20) extending upwardly in spaced parallel relationship therefrom to thereby receive the end portion of an I-beam joist (12). Elongate, substantially straight retaining prongs (30) extend downwardly and nominally inwardly from sidewalls (20) to terminate at a pointed tip (52) spaced slightly above joist lower chord (32). Prongs (30) deflect out of the way of lower chord (32) as joist (12) is lowered into seat portion (16) and then resume their nominal diagonal orientation once lower chord (32) has passed by, to overlap chord (32) and thus prevent upward movement of joist (12).

5 Claims, 3 Drawing Figures

JOIST HANGER

DESCRIPTION

1. Field of the Invention

This invention relates to building construction devices, and more particularly to a joist hanger especially adapted to secure an I-beam-shaped joist to a header without having to nail the joist to the hanger.

2. Background Art

Joist hangers are in common use in building construction to secure the ends of joists to headers. Typically the conventional joist hanger includes a U-shaped seat portion constructed from a base member to upwardly support the lower edge of the joist, and a pair of sidewalls extending upwardly in spaced parallel relationship from the base member to receive the sides of the joist therebetween. Conventional joist hangers also commonly comprise side flanges which extend laterally outwardly from the sidewalls to overlap a portion of the face of the header which abuts the end of the joist. Holes are provided in the side flanges through which nails are driven to attach the joist hanger to the header. Examples of known joist hangers constructed in this manner are disclosed by U.S. Pat. Nos. 537,505 and 546,147.

Often it is necessary to secure a joist to a conventional hanger to prevent uplift of the joist, for instance, during high winds and earthquakes. Also, one end of a joist must be downwardly restrained if the member is loaded in cantilever fashion, for example, to support an overhanging deck. To retain the joist within a conventional hanger, holes may be provided in the hanger sidewalls through which nails are driven into the joist. This manner of fixing the joist to the hanger may be satisfactory when the joist is constructed from a solid wooden member, but if the joist is formed in the shape of an I-beam having chords composed of thin laminated layers, the nails may cause the laminations to separate apart from each other. Even if the chords are composed of solid members, the nails may cause the chords to split.

Another known method of securing a joist to a conventional hanger includes constructing the hanger seat base plate with an upwardly extending projection which is receivable within a bore disposed in the bottom edge of the joist. However, forming a bore at the bottom edge of each end portion of each joist not only is burdensome and time-consuming, but also does not prevent uplift of the joist. A typical joist hanger utilizing this system for downward retention of a joist is found in U.S. Pat. No. 832,133.

A further known manner of attaching a joist to a conventional hanger includes forming the hanger with sharp ribs which extend upwardly from the hanger base member and laterally inwardly from the hanger sidewalls. When the joist is driven downwardly in place into the hanger, the ribs, extending transversely to the length of the joist, imbed within the joist and form grooves therein. The addition of the ribs, however, complicates the construction of the joist hanger, and does not effectively prevent the joist from rising upwardly within the hanger. An example of a known joist hanger constructed in this manner is disclosed by U.S. Pat. No. 2,500,636.

As disclosed in U.S. Pat. No. 546,147, a lug may be struck out in the upward direction from the seat of a joist hanger to imbed within the lower edge of the joist. Although the lug might prevent longitudinal movement of the joist, it cannot effectively preclude uplift of the joist.

A further known manner utilized for securing joists to hangers involves forming the hanger seat sidewalls with curved prongs which are struck out in the laterally outwardly direction. The prongs are bent approximately at a right angle with the tips of the prongs pointed laterally inwardly toward the interior of the seat portion of the hanger. Once the joist is in place, the prongs are driven into the joist, for instance, by a hammer blow. As with the use of nails to secure a joist to a hanger, the prongs also may cause damage to the joist. Moreover, the prongs must be manually driven into the joist by workmen, which operation not only is time-consuming, but also may be intentionally or inadvertently overlooked. A known type of joist hanger constructed in this manner is disclosed by U.S. Pat. No. 3,601,428.

Accordingly, it is a principal object of the present invention to provide a joist hanger which is capable of preventing uplift of an I-beam type of joist without causing damage to the joist and without requiring any affirmative steps on behalf of workmen, such as driving nails or prongs into the joist.

DISCLOSURE OF THE INVENTION

The present invention relates to a joist hanger which not only makes possible quick and convenient attachment of an I-beam shaped joist to a header, but also prevents uplift of the joist. The joist hanger includes a U-shaped seat portion composed of a flat seat base and a pair of seat sidewalls extending upwardly in spaced parallel relationship from opposite lateral sides of the seat base for receiving the end portion of an I-beam therebetween. The hanger also has a pair of flanges extending laterally outwardly from the seat sidewalls to overlap portions of the header face, and a top flange extending transversely to the upper edge portion of each side flange to overlap the top edge of the header. At least one elongate retaining prong is struck out from each hanger seat sidewall to extend downwardly and nominally laterally inwardly into the U-shaped seat portion of the hanger. Each retaining prong is substantially straight and terminates at a tip portion which is spaced upwardly from the seat base at a height corresponding to the depth of the I-beam lower chord. Each of the prongs is resiliently interconnected with its corresponding seat sidewall to deflect laterally outwardly out the envelope of the U-shaped seat when the I-beam is slid downwardly into the hanger. Once the I-beam bottoms on the seat base, the prongs snap back to their nominal, diagonally disposed positions so that if the I-beam tends to lift upwardly, the tips of the prongs bear downwardly against an upper surface of the lower chord to prevent such upward movement.

To increase its ability to resist bending and compression loads, each prong is curved in transverse cross section thereby enhancing its section modulus. Moreover, the tip of each prong is pointed enabling it to anchor firmly into the upper surface of the beam lower chord as the beam shifts upwardly thereby reducing the possibility that the prongs will be bent by uplifting movement of the beam.

Because the prongs automatically snap into retaining position once the I-beam is emplaced within the hanger, no nails or other fasteners must be manually driven into the I-beam by workmen, which procedure may be overlooked. Also, since the retaining prongs remain external of the beam, unlike the use of conventional hangers in which nails or other fasteners must be driven into the laminated or solid chords composing the beam, the hanger of the present invention does not damage the beam.

BRIEF DESCRIPTION OF THE DRAWINGS

The details of one typical embodiment of the present invention will be described in connection with the accompanying drawings, in which.

BEST MODE OF THE INVENTION

Figure 1:
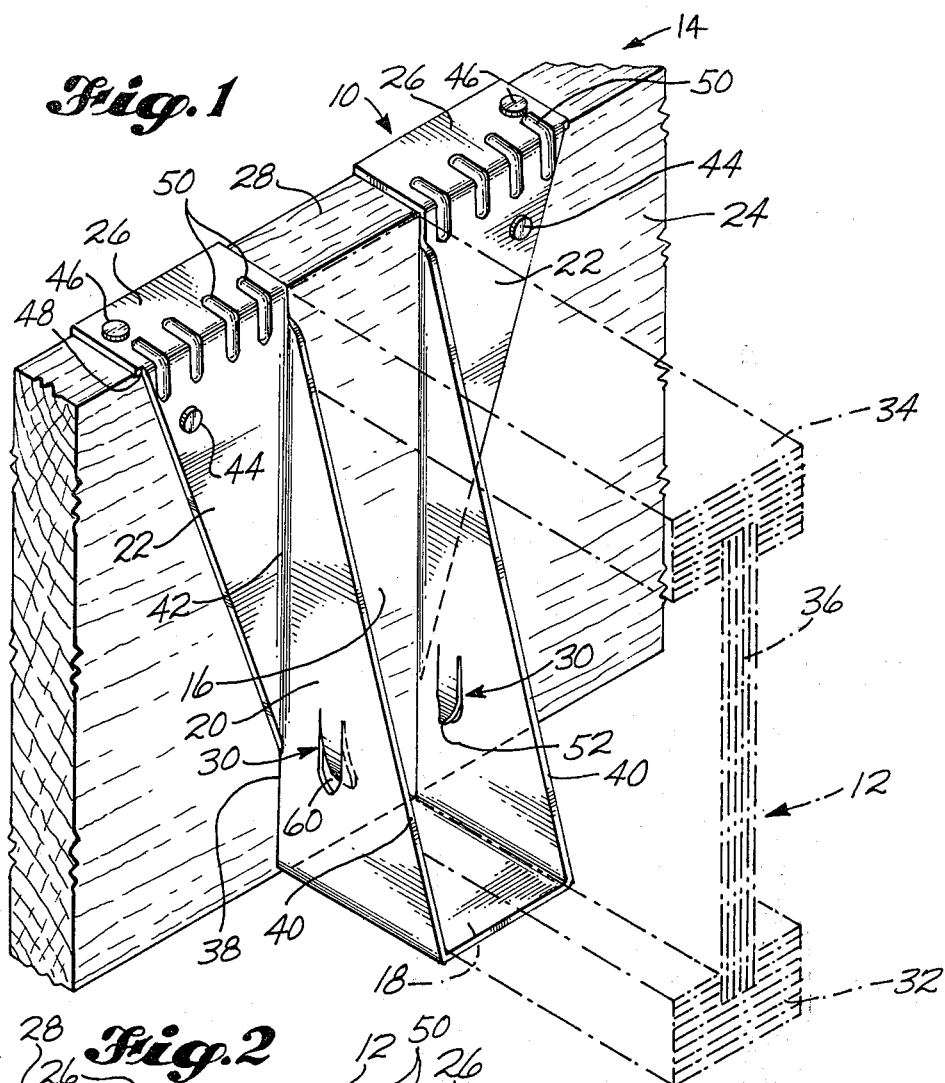
FIG. 1 is an isometric view of a joist hanger constructed according to the present invention illustrated as attached to a header and as supporting a laminated I-beam joist.

Referring initially to FIG. 1, a typical joist hanger 10 constructed according to the best mode of the present invention currently known to applicant is illustrated as securing one end of an I-beam joist 12 to a header 14. In basic form, hanger 10 includes a seat portion 16 composed of a base 18 and a pair of vertically disposed, transversely spaced-apart side walls 20 for vertically supporting and laterally constraining joist 12. A side flange 22 extends laterally outwardly from each side wall 20 to overlap header face 24, and a top flange 26 extends transversely from the upper edge of each side flange 22 to overlap the upper edge 28 of the header. A retaining prong 30 extends downwardly and diagonally inwardly from each hanger sidewall 20 to terminate just above the upper surface of beam lower chord 32 to prevent uplift of the beam. Constructing hanger 10 in this manner enables it to be formed from a single strip of gauge material bent at appropriate locations to form the various components of the hanger.

Figure 2:
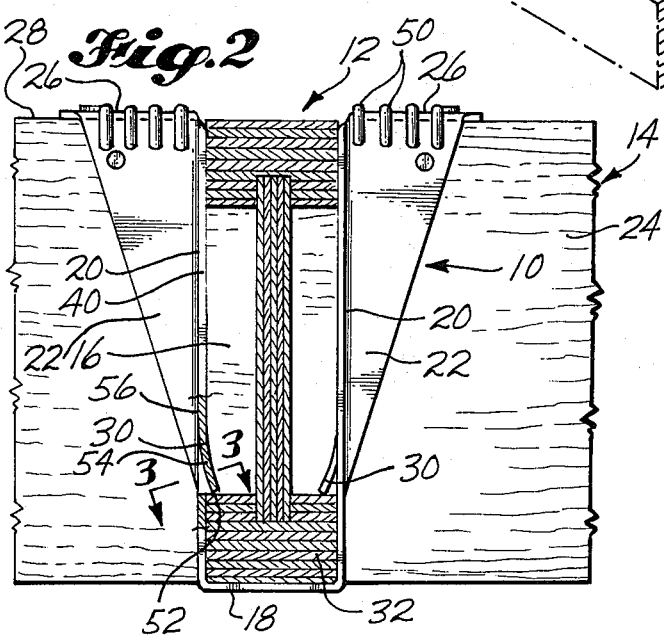
FIG. 2 is a front elevational view on a reduced scale of the joist hanger illustrated in FIG. 1.

Referring additionally to FIG. 2, joist 12 is illustrated as constructed in the shape of an I-beam having an upper chord 34, a lower chord 32 and a web 36, each composed of a plurality of thin wooden layers laminated together. The laminated construction of the joist enables it to support substantially the same loads carried by conventional unitary joists of comparable overall size while requiring approximately one-third less wood than needed for the conventional joist. Also, the wood from a tree can be utilized more efficiently to form laminations rather than to form unitary members of solid cross section. However, the laminated construction of joist 12 makes it difficult to secure the joist to a hanger by previously known means, such as by nailing, since the driving of nails into the joist may cause the laminations to separate, thus reducing the structural integrity and therefore the load-carrying capacity of the joist.

Rather than being of laminated construction, chords 32 and 34 of joist 12 may be composed of solid members. This manner of forming joist 12 still results in a significant savings in the quantity of wood needed to form the joist over conventional, solid joists of rectangular cross section. Hanger 10 also may be utilized to attach this type of joist to a header without the need to drive nails or other fasteners into the chords, which nails may split or otherwise damage the chords.

Still referring to FIGS. 1 and 2, hanger seat portion 16 is composed of a flat, generally rectangularly shaped base 18 which is of a width slightly wider than the width of joist bottom chord 32. Although the length of base 18, i.e. extending longitudinally of chord 32, is illustrated as slightly longer than the width of chord 32, such length may be varied to accommodate the load carried by joist 12. Sidewalls 20 extend upwardly from opposite lateral edges of base 18 to laterally constrain joist 12. The height of sidewalls 20 closely corresponds to the height of the joist. Each sidewall 20 is generally triangular in shape and includes a rear edge portion 38 abutting against header face 24 and a sloped front edge portion 40 extending diagonally upwardly from base 18 to the intersection of side flange 22 with top flange 26. Although not essential, preferably sidewalls 20 are disposed in spaced parallel relationship to each other, being separated by a distance just slightly greater than the width of the beam upper and lower chords 34 and 32.

Hanger 10 also includes a pair of triangularly shaped side flanges 22 extending laterally outwardly from rear edges 38 of each side wall 20 to overlap a portion of header front face 24. In the preferred manner of constructing hanger 10, side flanges 22 are formed by bending the strip of material from which the hanger is formed along vertical corners 42. At least one through hole is provided in each side flange 22 through which nails 44 may be driven to thereby attach hanger 10 to header 14. Hanger 10 also has a generally flat, rectangularly shaped top flange 26 which extends transversely from the upper edge portion of each side flange 22 to overlap the top edge 28 of the header. Through holes also may be provided in top flange 26 through which additional nails 46 are driven to further secure hanger 10 to the header. Ideally, top flanges 26 are formed by bending the strip of material from which header 10 is composed along corners 48 at the intersection of the top flange and a corresponding side flange 22. Preferably a plurality of ribs 50, extending transversely to corners 48, are formed at the intersection of side flanges 22 and top flanges 26 to thereby strengthen these portions of the hanger. Preferably ribs 50 are formed by extruding top flanges 26 upwardly and side flanges 22 outwardly to extend above the corresponding surfaces of these two flanges. For optimum effectiveness, ideally ribs 20 are made after top flanges 26 are bent relative to side flanges 22.

Figure 3:
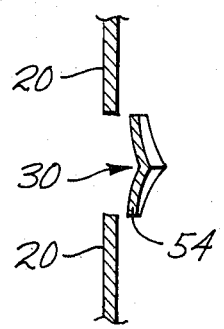
FIG. 3 is an enlarged, fragmentary, partial cross-sectional view of the joist hanger shown in FIG. 2 taken substantially along lines 3—3 thereof, to specifically illustrate the construction of the retaining prongs.

Additionally referring to FIG. 3, hanger 10 further includes at least one elongate, substantially flat retaining prong 30 which extends downwardly and nominally laterally inwardly from each sidewall 20. Each retaining prong 30 has a pointed lower tip portion 52 which terminates just above the upper surface of joist lower chord 32. In side profile, as best illustrated in FIG. 2, each retaining prong 30 includes a substantially straight shank portion 56 and a curved base portion 54 at the intersection of the shank portion and sidewall 20. By this construction, prongs 30 exhibit sufficient resiliency to deflect laterally out of hanger seat portion 16 and into clearance openings 60, provided in sidewalls 20, when lower chord 32 pushes against the prongs as joist 12 is lowered into hanger 10. Once joist 12 is in place, prongs 30 snap back into their nominal diagonal positions, as illustrated in FIGS. 1 and 2, thereby overlying the upper surface of lower chord 32. As most clearly shown in FIG. 3, prongs 30 are curved in transverse cross section to increase their section modulus which in turn enhances their capability to carry compression and bending loads imposed thereon during uplift of lower chord 32.

Ideally, retaining prongs 30 are formed by initially piercing hanger sidewalls 20 along a pattern corresponding to the sides and tip portions of prong 30. Thereafter the pierced portion of the sidewalls are stricken with a male die to produce prongs 30 in the shape and orientation described above and illustrated in FIGS. 1-3.

In use, hanger 10 is mounted on header 14 by driving nails 44 and 46 through openings provided in side and top flanges 22 and 26, respectively. Thereafter, joist 12 is simply lowered into place within seat portion 16. As lower chord 32 passes by retaining prongs 30, the sides of the chord push the prongs outwardly through clearance openings 60 to allow passage of the chord. Once lower chord 32 bottoms on base 18, prongs 30 snap back into their nominal, diagonally disposed position illustrated in FIG. 2, to thereby push downwardly on the upper surface of the chord if joist 12 tends to lift upwardly. No nails or other types of fasteners must be driven into the joist member. Thus, it will be appreciated that prongs 30 automatically preclude upward movement of joist 12 once the joist is installed within hanger 10.

As will be apparent to those skilled in the art to which the invention is addressed, the present invention may be embodied in forms and in embodiments other than that specificlly disclosed above, without departing from the spirit or essential characteristics of the invention. The particular embodiment of joist hanger 10, described above, is therefore to be considered in all respects as illustrative and not restrictive, i.e. the scope of the present invention is set forth in the appended claims rather than being limited to the example of joist hanger 10 as set forth in the foregoing description.

What is claimed is:

1. A joist hanger for supporting the end portion of an I-beam shaped joist having a lower chord of a given depth, such joist hanger including:

(a) a laterally disposed seat base;
   (b) a pair of seat sidewalls extending upwardly from opposite lateral sides of the seat base that cooperates with the seat base and defines a U-shaped seat portion that receives the end portion of said I-beam shaped joist therein;
   (c) header overlapping flanges extending laterally from said seat sidewalls; and
   (d) at least one elongate retaining prong extending perpendicular to said base and nominlly laterally inward from each sidewall and into the U-shaped seat portion, said prong terminating at a tip portion spaced from the seat base a distance corresponding to the depth of the lower chord of the I-beam shaped joist, each of said prongs being resiliently interconnected to a corresponding seat sidewall that deflects laterally outward from nominal position into retracted position substantially out of the envelope of said U-shaped seat which allows downward passage of the lower chord of the I-beam shaped joist and then snaps back into its nominal, inward position once the I-beam shaped joist is seated on the seat base so that if the I-beam shaped joist tends to lift upwardly, the tip of the prong bears downwardly against an upper surface of the lower chord of the joist and prevents such upward movement.

2. The joist hanger according to claim 1, wherein each of said retaining prongs is generally straight.

3. The joist hanger according to claim 1 or 2, wherein each of said retaining prongs extends in a laterally inward direction from a corresponding seat sidewall and assumes a diagonally downwardly and laterally inwardly disposed nominal position.

4. The joist hanger according to claim 1 or 2, wherein each of said retaining prongs is curved in transverse cross section.

5. The joist hanger according to claim 1 or 2, wherein each of said retaining prongs includes a pointed tip portion.

* * * * *